US010812784B2

(12) United States Patent
Chang et al.

(10) Patent No.: US 10,812,784 B2
(45) Date of Patent: Oct. 20, 2020

(54) LIGHT FIELD DISPLAY APPARATUS AND METHOD FOR CALIBRATING DISPLAY IMAGE THEREOF

(71) Applicant: Coretronic Corporation, Hsin-Chu (TW)

(72) Inventors: Chuan-Chung Chang, Hsin-Chu (TW); Hsin-Hsiang Lo, Hsin-Chu (TW); Fu-Ming Chuang, Hsin-Chu (TW)

(73) Assignee: Coretronic Corporation, Hsin-Chu (TW)

(*) Notice: Subject to any disclaimer, the term of this patent is extended or adjusted under 35 U.S.C. 154(b) by 0 days.

(21) Appl. No.: 16/056,536

(22) Filed: Aug. 7, 2018

(65) Prior Publication Data

US 2019/0052866 A1 Feb. 14, 2019

(30) Foreign Application Priority Data

Aug. 9, 2017 (CN) .......................... 2017 1 0673880

(51) Int. Cl.
*H04N 13/327* (2018.01)
*H04N 13/383* (2018.01)
(Continued)

(52) U.S. Cl.
CPC ....... *H04N 13/327* (2018.05); *G02B 27/0093* (2013.01); *G02B 27/0172* (2013.01);
(Continued)

(58) Field of Classification Search
None
See application file for complete search history.

(56) References Cited

U.S. PATENT DOCUMENTS

2009/0273662 A1 11/2009 Lucente
2012/0075435 A1* 3/2012 Hovanky ............... H04N 13/20
348/51
(Continued)

FOREIGN PATENT DOCUMENTS

CN 104769935 7/2015
CN 104914575 9/2015

OTHER PUBLICATIONS

"Office Acton of China Counterpart Application", dated Jul. 3, 2020, p. 1-p. 8.
(Continued)

*Primary Examiner* — Samira Monshi
(74) *Attorney, Agent, or Firm* — JCIPRNET

(57) ABSTRACT

A light field display apparatus and a method for calibrating a display image thereof are provided. The method for calibrating a display image includes: dividing a display image to generate a plurality of block images; displaying the block images by a display, and passing the block images through a light field device to generate a combination image; providing an image capturer to capture the combination image, and comparing the display image and the combination image to generate error information; receiving user parameters; and adjusting at least one of the block images in the display image according to the user parameters and the error information. Without providing a mechanical adjustment device, the light field display apparatus of the invention can compensate for display errors that may be caused by the device-internal parameters and the user parameters, which not only enhances display quality, but also enhances convenience in use.

18 Claims, 9 Drawing Sheets

(51) Int. Cl.
 *H04N 13/307* (2018.01)
 *G06F 3/01* (2006.01)
 *G02B 27/00* (2006.01)
 *G02B 27/01* (2006.01)
 *H04N 13/344* (2018.01)
 *H04N 13/139* (2018.01)
 *H04N 13/122* (2018.01)

(52) U.S. Cl.
 CPC .............. *G06F 3/011* (2013.01); *G06F 3/013* (2013.01); *H04N 13/122* (2018.05); *H04N 13/139* (2018.05); *H04N 13/307* (2018.05); *H04N 13/344* (2018.05); *H04N 13/383* (2018.05); *G02B 2027/0134* (2013.01); *G09G 2320/0693* (2013.01)

(56) References Cited

U.S. PATENT DOCUMENTS

| | | |
|---|---|---|
| 2015/0262424 A1 | 9/2015 | Tabaka et al. |
| 2016/0042501 A1 | 2/2016 | Huang et al. |
| 2017/0124928 A1 | 5/2017 | Edwin et al. |

OTHER PUBLICATIONS

"Search Report of Europe Counterpart Application", dated Dec. 19, 2018, p. 1-p. 10.

Douglas Lanman et al.,"Near-eye light field displays," ACM Transactions on Graphics (TOG), ACM, US, vol. 32, No. 6, Nov. 30, 2013, pp. 1-10.

\* cited by examiner

LIGHT FIELD DISPLAY APPARATUS AND METHOD FOR CALIBRATING DISPLAY IMAGE THEREOF

CROSS-REFERENCE TO RELATED APPLICATION

This application claims the priority benefit of China application serial no. 201710673880.2, filed on Aug. 9, 2017. The entirety of the above-mentioned patent application is hereby incorporated by reference herein and made a part of this specification.

BACKGROUND OF THE INVENTION

Field of the Invention

The invention relates to a light field display apparatus, and in particular, to a method for calibrating a display image of a light field display apparatus.

Description of Related Art

In the current art, light field display apparatuses may be classified into two types, i.e., binocular and monocular types, according to their framework. In a binocular near-eye display apparatus, three-dimensional visual effect is created based on the principle of parallax between the two eyes. For users wearing this type of near-eye display apparatus, since the interocular distance varies among different users, to provide correct three-dimensional images to the users, the near-eye display apparatus in the prior art requires an additional hardware adjustment device to allow the users to adjust relative positions of the two eyepieces. Moreover, regarding differences in visual acuity among the users, the near-eye display apparatus in the prior art also provides an adjustment mechanical device for adjusting a focal length of the eyepiece. It is thus known that in the near-eye display apparatus in the prior art, to provide these adjustment devices, it is required to dispose a plurality of mechanical structures, which cause increases in a size, a weight, and costs of the near-eye display apparatus.

On the other hand, even in the monocular near-eye display apparatus, in the prior art, mechanical adjustment structures are also provided for adjusting display positions and directions of images. Alternatively, to accommodate the user's head shape, a nose pad position, and eye positions, the near-eye display apparatus in the prior art also provides corresponding adjustment structures, which cause increases in the size, the weight, and the costs.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention provides a light field display apparatus and a method for calibrating a display image thereof that calibrate the display image by adjusting at least one of a plurality of block images.

To achieve one, part, or all of the foregoing purposes or other purposes, an embodiment of the invention provides a method for calibrating a display image applicable to a light field display apparatus. The method includes: dividing a display image to generate a plurality of block images; displaying the block images by a display, and passing the block images through a light field device to generate a combination image; providing an image capturer to capture the combination image, and comparing the display image and the combination image to generate error information; receiving user parameters; and adjusting at least one of the block images in the display image according to the user parameters and the error information.

To achieve one, part, or all of the foregoing purposes or other purposes, an embodiment of the invention provides a light field display apparatus, including a display, a light field device, an image capturer, and a controller. The display displays a plurality of block images. The light field device is disposed to overlap with the display. The block images displayed by the display are passed through the light field device to generate a combination image. The image capturer captures the combination image. The controller is coupled to the display and the image capturer. The controller is configured to: divide a display image to generate the block images; compare the display image and the combination image to generate error information; receive user parameters; and adjust at least one of the block images in the display image according to the error information and the user parameters.

In light of the above, the embodiments of the invention at least exhibit one of the advantages or effects below. In the invention, the display image of the light field display apparatus is calibrated by capturing the combination image generated by the light field display apparatus, comparing the error information between the original display image and the combination image, and adjusting at least one of the plurality of block images correspondingly generating the error information according to the error information. Through the image calibration means of the invention, without hardware adjustment means, the light field display apparatus can adaptively adjust the display image according to the user parameters corresponding to the user properties to enhance display quality of the light field display apparatus.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

To provide a further understanding of the aforementioned and other features and advantages of the disclosure, exemplary embodiments, together with the reference drawings, are described in detail below.

DESCRIPTION OF THE EMBODIMENTS

In the following detailed description of the preferred embodiments, reference is made to the accompanying drawings which form a part hereof, and which are shown by way of illustrating specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces," and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
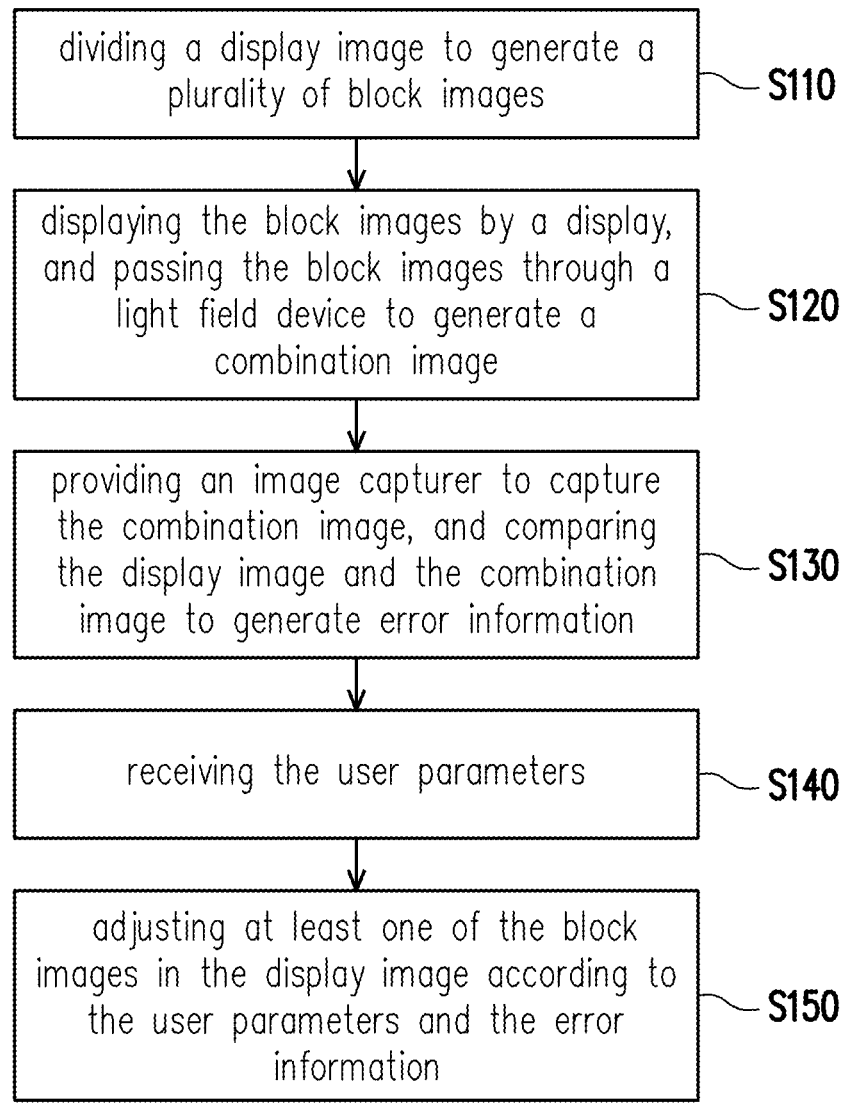
FIG. 1 is a flowchart illustrating a method for calibrating a display image according to an embodiment of the invention.
Figure 2A:
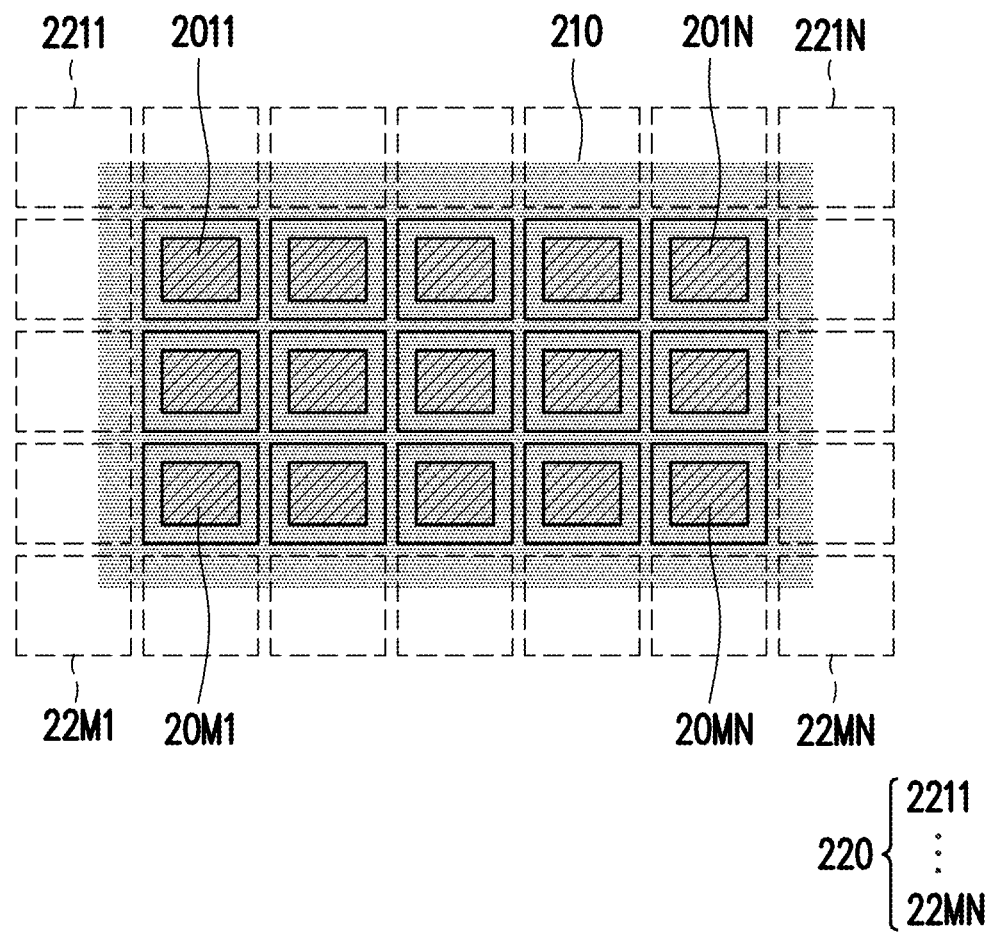
FIG. 2A is a diagram illustrating a relationship between a display and a light field device according to an embodiment of the invention.
Figure 2B:
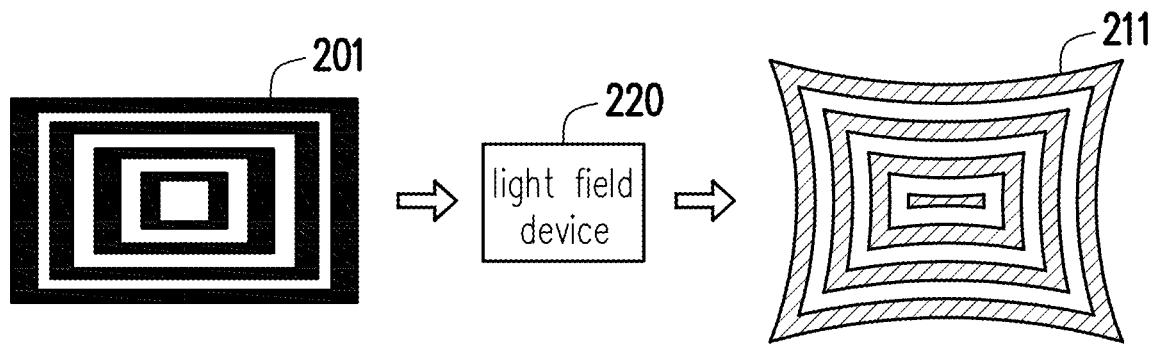
FIG. 2B is a schematic diagram illustrating a generation method of a combination image.
Figure 2C:
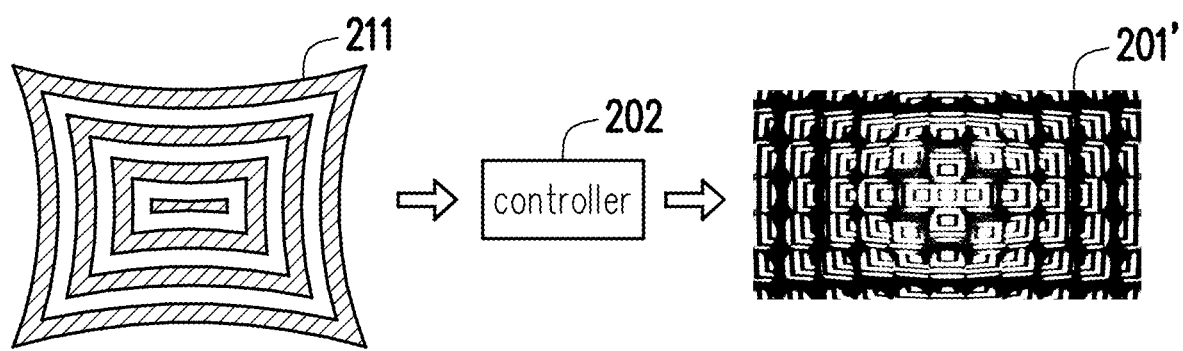
FIG. 2C is a schematic diagram illustrating a generation method of a precompensation image.
Figure 2D:
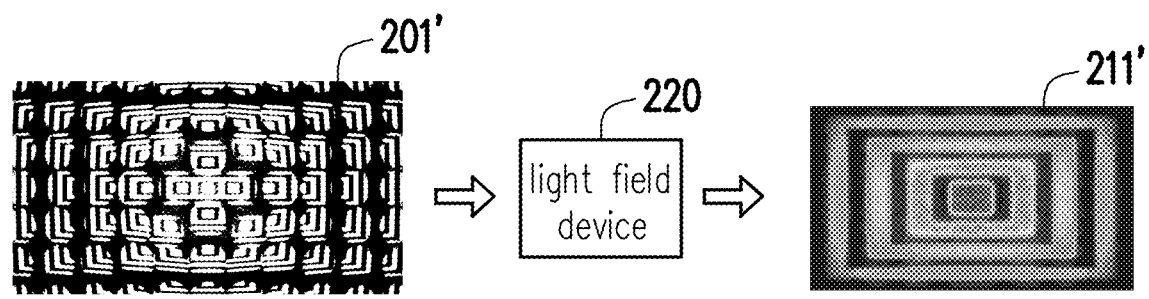
FIG. 2D is a schematic diagram illustrating a generation method of a calibrated combination image.

Referring to FIG. 1, FIG. 1 is a flowchart illustrating a method for calibrating a display image according to an embodiment of the invention. The method for calibrating a display image of the embodiment is applicable to a light field display apparatus, which is also a near-eye display apparatus. Specifically, in FIG. 1, in step S110, a display image is divided to generate a plurality of block images. In step S120, the block images are displayed by a display, and the block images are passed through a light field device to generate a combination image. It shall be noted here that, referring to FIG. 1, FIG. 2A, FIG. 2B, FIG. 2C, and FIG. 2D at the same time, wherein FIG. 2A is a diagram illustrating a relationship between the display and the light field device of the embodiment of the invention, FIG. 2B is a schematic diagram illustrating a generation method of the combination image, FIG. 2C is a schematic diagram illustrating a generation method of a precompensation image, and FIG. 2D is a schematic diagram illustrating a generation method of a calibrated combination image. In FIG. 2A, a light field device 220 is composed of a plurality of sub-light field units 2211 to 22MN. The sub-light field units 2211 to 22MN are arranged in arrays, wherein the sub-light field units 2211 to 22MN may be micro-lenses and combine into micro-lens arrays to form the light field device 220. More specifically, in FIG. 2A, the light field device 220 and the display 210 may be disposed to overlap by a predetermined distance, wherein a display area of the display 210 faces the light field device 220. Moreover, the display area of the display 210 is smaller than a total area covered by the sub-light field units 2211 to 22MN.

In addition, in FIG. 2A and FIG. 2B, a display image 201 in step S110 may be transmitted to a controller 202 having computational capability. According to the configurational relationship between the display 210 and the sub-light field units 2211 to 22MN shown in FIG. 2A, the controller 202 divides the display image 201 to generate a plurality of block images 2011 to 20MN. The display 210 displays the plurality of block images 2011 to 20MN of the display image 201. In step S120, the plurality of block images 2011 to 20MN of the display image 201 are respectively received by the corresponding sub-light field units 2211 to 22MN in FIG. 2A and FIG. 2B to generate a combination image 211.

Referring to FIG. 1, FIG. 2A, FIG. 2B, and FIG. 2C again, in step S130, an image capturer (not illustrated) is provided to capture the combination image 211 generated by the light field device 220, and then an operation of comparing the display image 201 and the combination image 211 is performed to generate error information. It shall be noted here that the error information may include a position shift between corresponding patterns in the display image and the combination image, may include a color difference between corresponding patterns in the display image and the combination image, and may include a pattern difference at corresponding positions in the display image and the combination image. Any image differences at corresponding positions between the display image and the combination image may be recorded as the error information.

It shall be noted that there are many factors that contribute to generation of the error information, including, for example, optical information of the display 210 (e.g., a pixel count, a pixel size, a pixel shape, and its arrangement in the display 210), optical information of the light field device 220 (e.g., a focal length of each of the sub-light field units 2211~22MN and a gap between the adjacent sub-light field units 2211~22MN), spatial information between the display 210 and the light field device 220 in the light field display apparatus, and relevant parameters of a user of the light field display apparatus (e.g., a pupillary distance, an eye relief, a pupil size, a view direction, etc.).

Device-internal parameters may be obtained through a pre-shipment acceptance test after assembly of the light field display apparatus is completed. Therefore, the device-internal parameters may be stored in advance in a storage device (not illustrated) of the light field display apparatus to be provided as the basis for the controller (e.g., the controller 202) in the light field display apparatus to generate the block images.

Regarding the user parameters, the light field display apparatus may obtain the user parameters through the operation of receiving the user parameters performed in step S140. In the embodiment of the invention, the user parameters may be inputted by the user into the light field display apparatus through a data input means familiar to people skilled in the art and stored in the storage device in the light field display apparatus. Alternatively, in other embodiments of the invention, the light field display apparatus may also be disposed with a mechanism such as a pupil detector to automatically obtain the relevant user parameters including the pupillary distance, the eye relief, the view direction, and the pupil size.

In step S150, at least one of the block images is adjusted according to the user parameters and the error information obtained in step S130 to calibrate the display image. Specifically, as shown in FIG. 2C, in step S150, according to the generated error information, a position where a difference between the display image and the combination image exists is looked for, and the block image corresponding to the position where the difference exists is selected to perform the operation of adjusting the image. In other words, according to the user parameters and the error information, at least one error block image in the display image 201 is adjusted and a precompensation image 201' is generated. Specifically, a number of the selected block images is determined by the error information and may be one or more than one, which is not specifically limited. Accordingly, as shown in FIG. 2D, the user can see a calibrated combination image 211' formed after the precompensation image 201' is passed through the light field device 220.

Figure 3A:
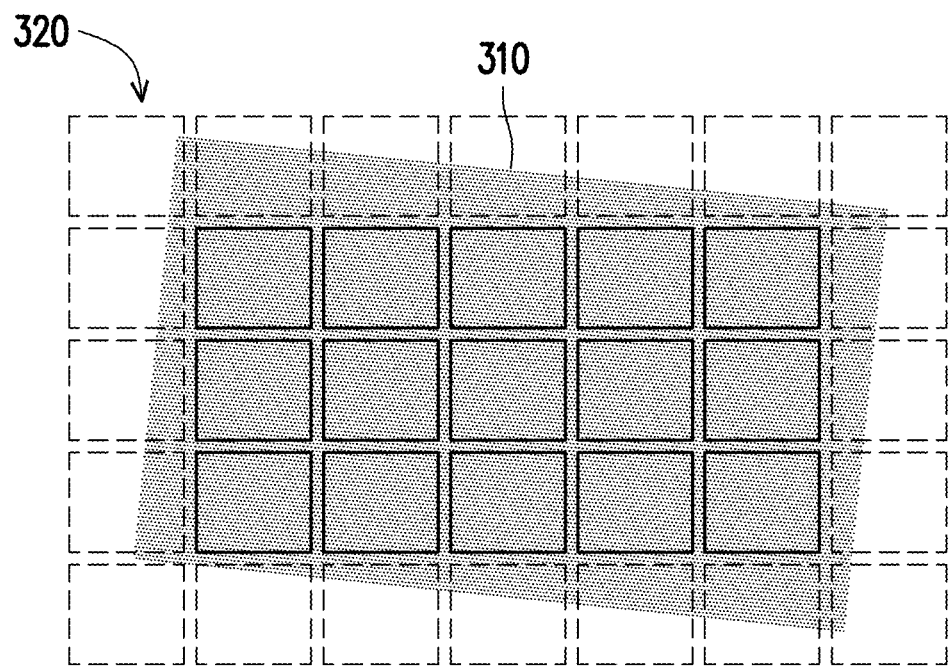
FIG. 3A and FIG. 3B are schematic diagrams illustrating a method for calibrating a display image according to an embodiment of the invention.
Figure 3B:
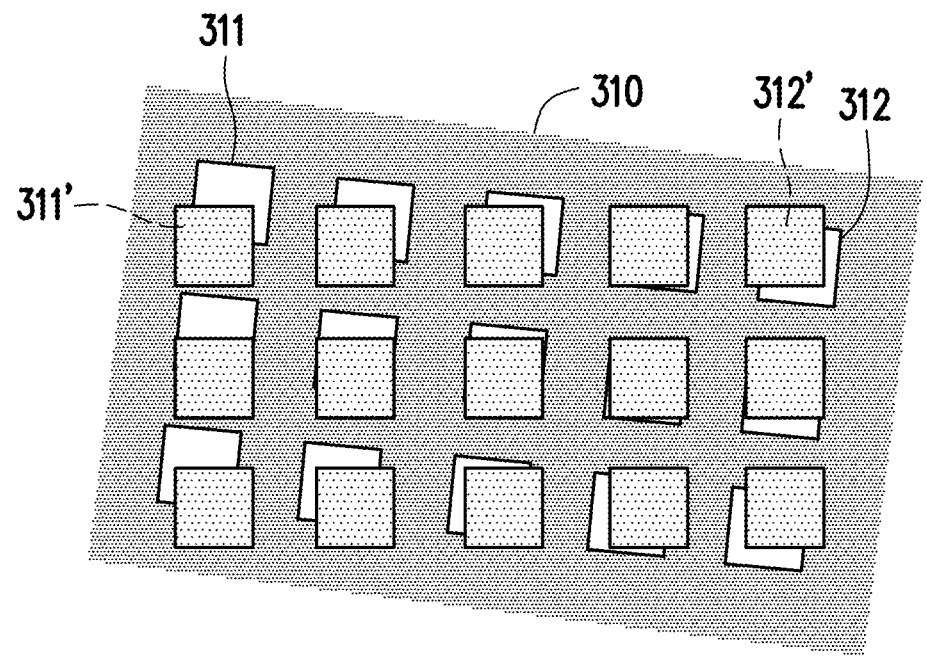

For the description below, referring to FIG. 3A and FIG. 3B, FIG. 3A and FIG. 3B are schematic diagrams illustrating a method for calibrating a display image according to an embodiment of the invention. In FIG. 3A and FIG. 3B, a shift exists in position information between a display 310 and a light field device 320 (for example, horizontal axes and vertical axes of the display 310 and the light field device 320 cannot be aligned with each other). At this time, by displaying a plurality of rectangular-framed block images 311, 312 on the display 310, each of the block images includes a characteristic pattern (not illustrated). Through the light field device 320, the characteristic patterns of the block images may generate corresponding comparison patterns in a combination image. Respectively comparing the position information of the characteristic patterns and the correspondingly generated comparison patterns, the error information of a shift amount of relative positions of the light field device 320 and the display 310 is obtained. According to the error information and the user parameters, the light field display apparatus adjusts display positions of the block images on the display 310 (for example, adjusting the block image 311 into a block image 311' and adjusting the block image 312 into a block image 312') and completes the operation of calibrating the display image.

Figure 4A:
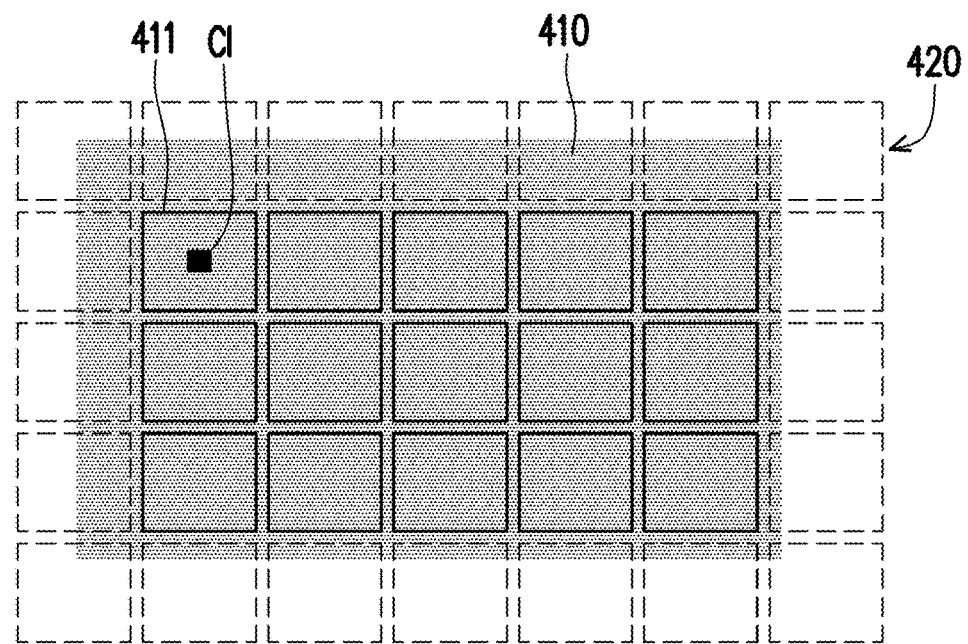
FIG. 4A to FIG. 4C are schematic diagrams illustrating a method for calibrating a display image according to another embodiment of the invention.
Figure 4B:
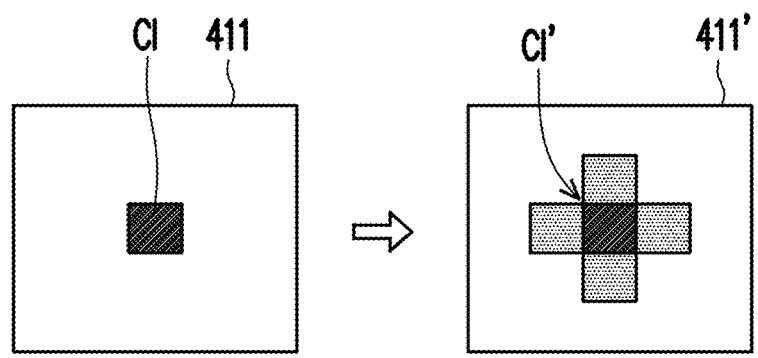
Figure 4C:
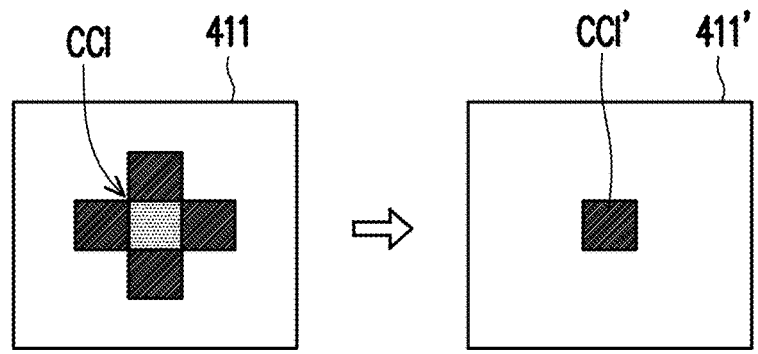

For the description below, referring to FIG. 4A to FIG. 4C, FIG. 4A to FIG. 4C are schematic diagrams illustrating a method for calibrating a display image according to another embodiment of the invention. In FIG. 4A, a deviation exists in a distance between a display 410 and a light field device 420 (for example, the distance after assembly is greater or smaller than a standard value). The display image is divided into a plurality of block images 411, and the block image 411 including a characteristic pattern CI is displayed on the display 410. According to FIG. 4B, the characteristic pattern CI in the block image 411 is presented as a comparison pattern CI' in a combination image 411' after passing through the light field device 420. By comparing a difference (e.g., position information) between the characteristic pattern CI and the comparison pattern CI', the controller (e.g., the controller 202 in FIG. 2C generates error information and defines the block image 411 as an error block image. According to the error information, the display image is adjusted to obtain a precompensation image. In other words, the characteristic pattern CI in the block image 411 in FIG. 4B is adjusted into a characteristic pattern CCI of the error block image (the block image 411) as shown in FIG. 4C, such that the characteristic pattern CCI of the error block image (the block image 411) in the precompensation image can be presented as a corresponding comparison pattern CCI' in the combination image 411' after passing through the light field device 420, and the comparison pattern CCI' may be identical to the characteristic pattern CCI.

It shall be noted that a number of the error block images is not specifically limited. In the embodiment of the invention, the characteristic pattern may be disposed in each of the block images, and according to whether error information exists between the characteristic patterns and the correspondingly generated comparison patterns, it is determined whether each of the block images is an error block image.

Regarding how the precompensation image is obtained, it may be generated by an operation of subtracting the comparison pattern CI' and the characteristic pattern CI from each other, or further performing an inverse processing on the difference between the characteristic pattern CI and the comparison pattern CI' to obtain conversion information for generating the precompensation image. Moreover, the precompensation image may be simultaneously generated according to the user parameters, or the precompensation image may be simultaneously generated according to an impact on display effect caused by both the device-internal parameters and the user parameters.

Figure 5A:
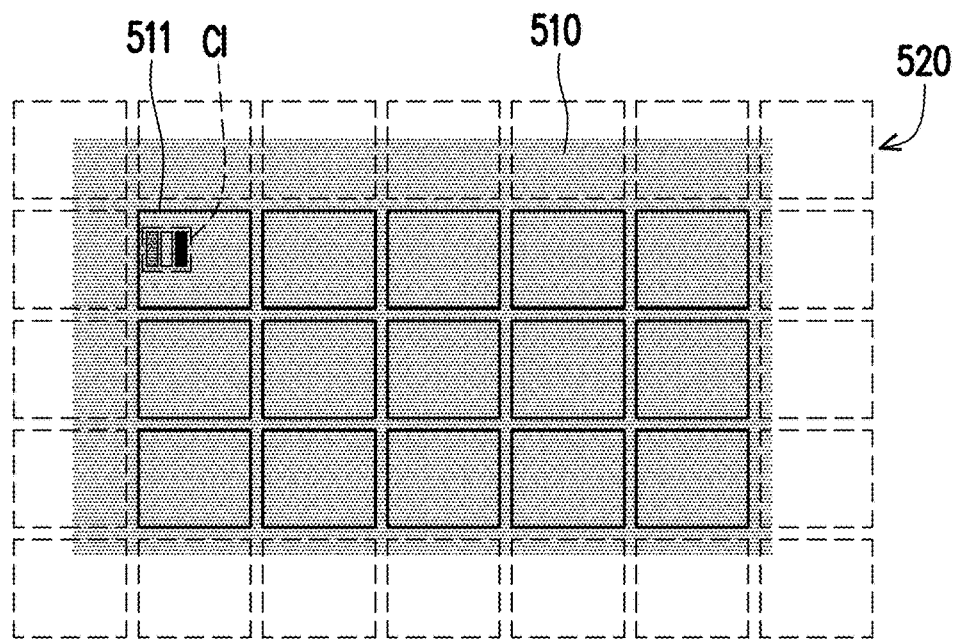
FIG. 5A to FIG. 5C are schematic diagrams illustrating a method for calibrating a display image according to another embodiment of the invention.
Figure 5B:
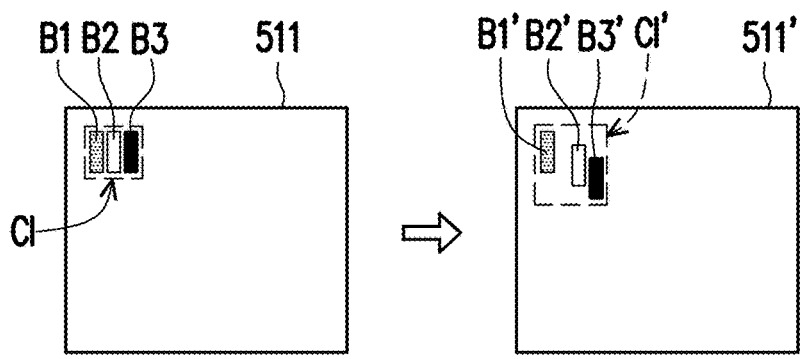
Figure 5C:
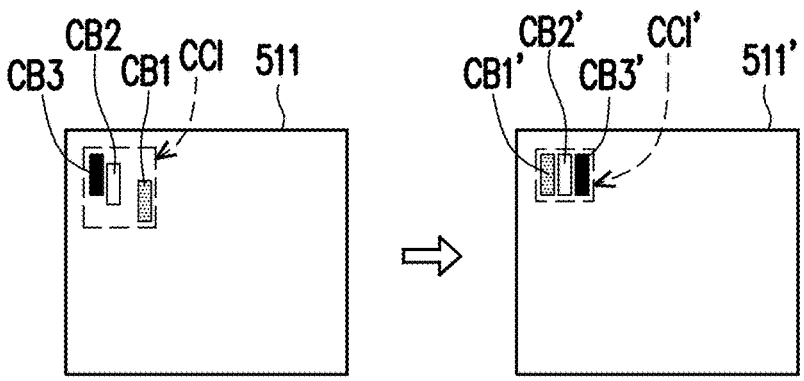

For the description below, referring to FIG. 5A to FIG. 5C, FIG. 5A to FIG. 5C are schematic diagrams illustrating a method for calibrating a display image according to another embodiment of the invention. In the embodiment, the light field display apparatus may generate a characteristic pattern CI on the display image according to the device-internal parameters, wherein the characteristic pattern CI is generated in a block image 511. In the embodiment, the characteristic pattern CI includes a plurality of color regions B1 to B3 of different wavelengths.

With a deviation existing in a distance between a display 510 and a light field device 520, the characteristic pattern CI in the block image 511 passes through the light field device 520 and generates a comparison pattern CI' in a combination image 511'. In the comparison pattern CI', color regions B1' to B3' are dispersedly arranged, and positions of the color regions B1' to B3' in the combination image 511' are different from positions of the color regions B1 to B3 in the block image 511.

Error information is obtained by comparing the comparison pattern CI' and the characteristic pattern CI. According to the error information and the user parameters, the display image is adjusted, such that the light field display apparatus can generate a precompensation image, namely, adjusting the characteristic pattern CI in the block image 511 as shown in FIG. 5B into a characteristic pattern CCI in an error block image (the block image 511) as shown in FIG. 5C. Accordingly, the characteristic pattern CCI of the error block image (the block image 511) in the precompensation image can be presented as a corresponding comparison pattern CCI' in the combination image 511' after passing through the light field device 520, and the comparison pattern CCI' may be identical to the characteristic pattern CI. Specifically, in the characteristic pattern CCI of the error block image in the precompensation image, positions of color regions CB1 to CB3 may be obtained according to position shifts of the respective corresponding color regions B1 and B1', B2 and B2', and B3 and B3' of the characteristic pattern CI in the display image and the comparison pattern CI' in the combination image 511'. For example, in the characteristic pattern CCI, the positions of the color regions CB1 to CB3 may be generated by causing the color regions B1 to B3 in the characteristic pattern CI to undergo a shift in a direction opposite to the shift of the positions of the color regions B1' to B3' in the comparison pattern CI'.

Figure 6A:
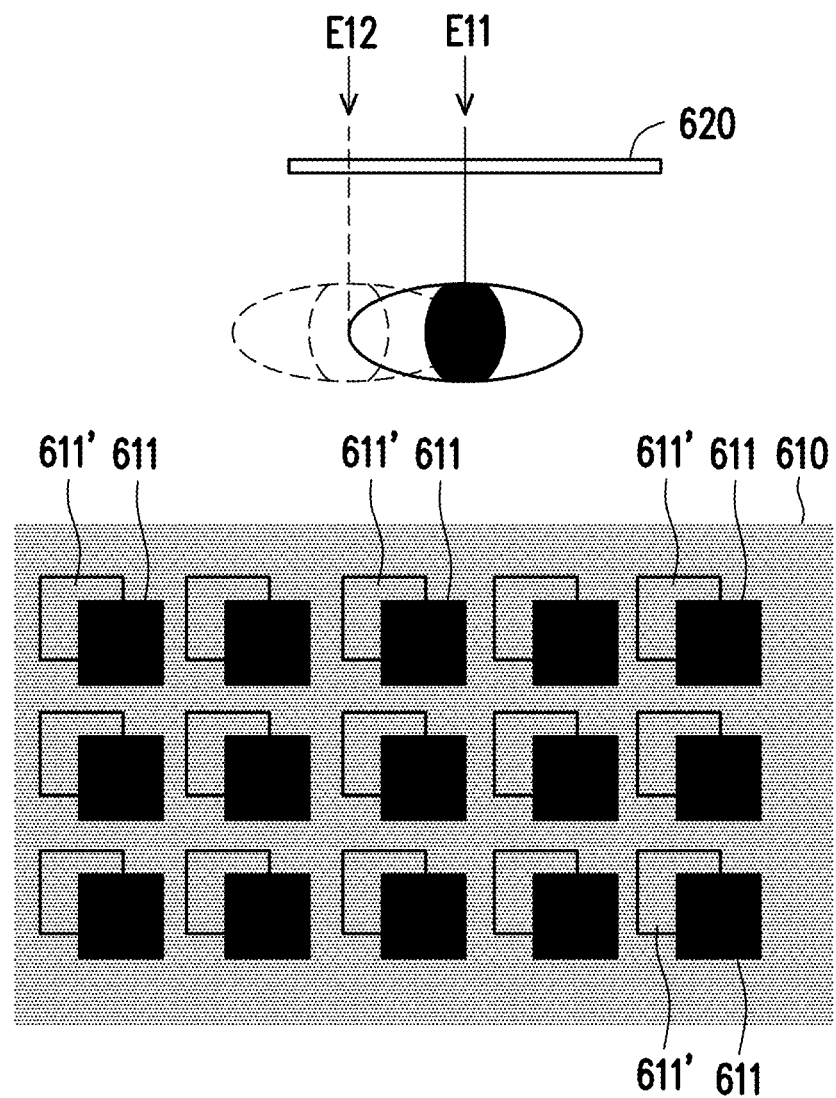
FIG. 6A and FIG. 6B are schematic diagrams illustrating a method for calibrating a display image according to another embodiment of the invention.
Figure 6B:
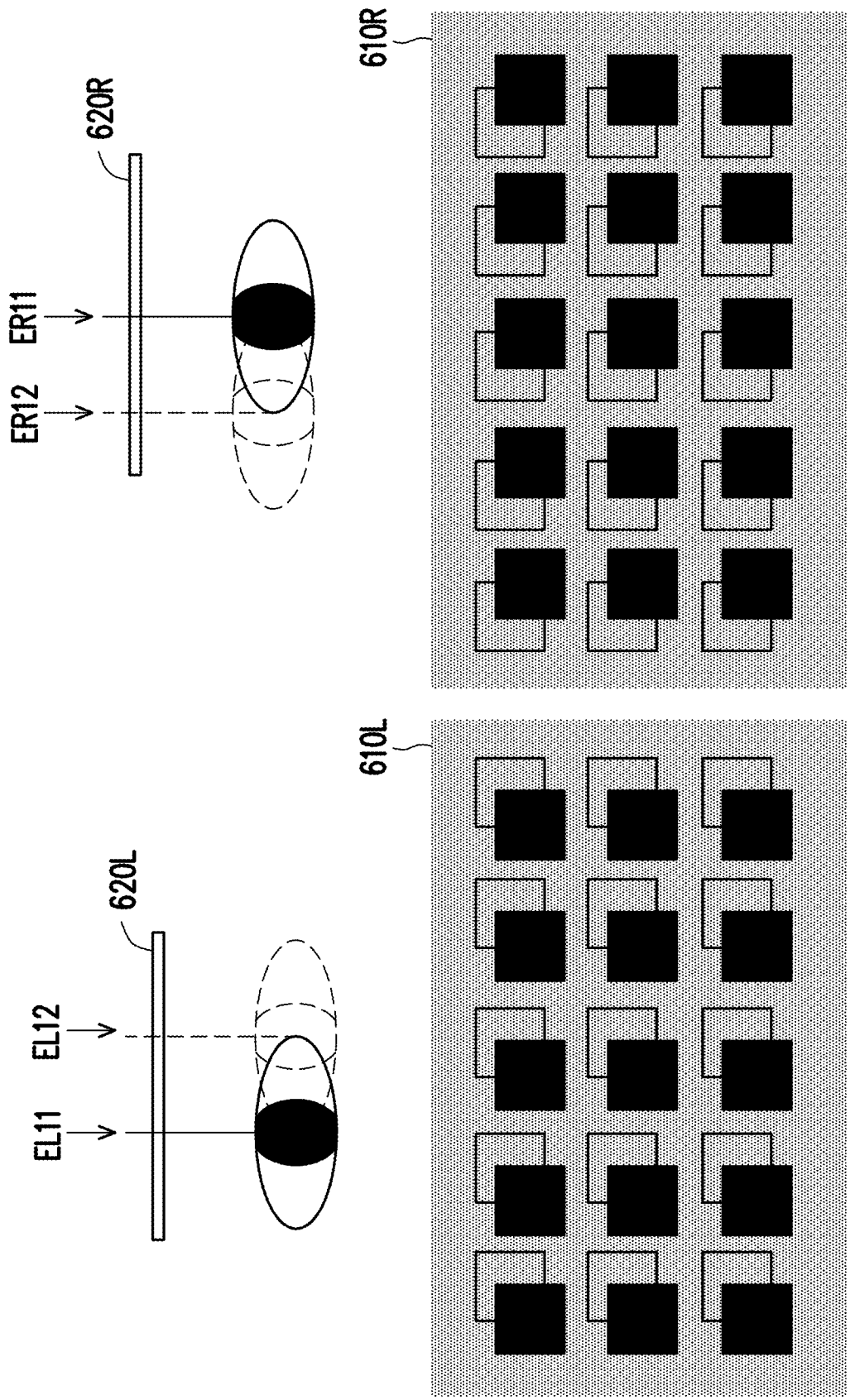

For the description below, referring to FIG. 6A and FIG. 6B, FIG. 6A and FIG. 6B are schematic diagrams illustrating a method for calibrating a display image according to another embodiment of the invention. In FIG. 6A, taking a monocular light field display apparatus as an example, when a central position of an eye of the user shifts from a position E11 to a position E12 and thus cannot be aligned with a central point of a light field device 620, the user sees a phenomenon of a position shift in a combination image generated by the light field device 620. Specifically, a plurality of block images 611 including characteristic patterns are displayed on a display 610, comparison patterns correspondingly generated by the characteristic patterns in the combination image are inspected, and error information between the comparison patterns and the corresponding characteristic patterns is calculated. Accordingly, a precompensation image can be obtained according to the error information, or/and the precompensation image is obtained according to the user parameters including feedback information of the user, the pupil position, the view direction, and the pupillary distance. An error block image (the block image 611) where error exists is further adjusted into a block image 611' according to the precompensation image to complete the operation of calibrating the image.

In FIG. 6B, taking a binocular light field display apparatus as an example, when a central position of a left eye of the user shifts from a position EL11 to a position EL12 and a central position of a right eye shifts from a position ER11 to a position ER12 and thus cannot be respectively aligned with central points of light field devices 620L, 620R corresponding to the left eye and the right eye of a user, a phenomenon of a position shift exists in combination images generated by both of the light field devices 620L, 620R. Therefore, according to the description in the embodiment of FIG. 6A, the calibration operation may be performed for images of displays 610L, 610R respectively corresponding to the left eye and the right eye.

As evident in the embodiment of FIG. 6B, the method for calibrating the display image of the embodiment of the invention may make adjustments for the pupillary distance of different users through image calibration. Accordingly, it is not necessary to provide a mechanical adjustment mechanism in the light field display apparatus for the user to perform the operation of calibration. In addition to enhancing convenience for the user, such design further lowers the manufacturing costs for the light field display apparatus.

On the other hand, in the embodiment of the invention, the user parameters may further be generated by detecting the focal length of the user eye. Moreover, the display size of the block images is adjusted according to the focal length of the user eye so as to allow different users to see a clear combination image and to further enhance the display effect of the light field display apparatus.

According to the foregoing embodiments, it is also found that in the light field display apparatus in the embodiment of the invention, errors of the display image resulting from device properties of the display and the light field device themselves, spatial properties between the display and the light field device, or user properties can all be compensated through the above-described image calibration means. In other words, it is not necessary to dispose a mechanical device for image calibration in the light field display apparatus, which not only lowers the manufacturing costs but also enhances convenience in use.

Figure 7:
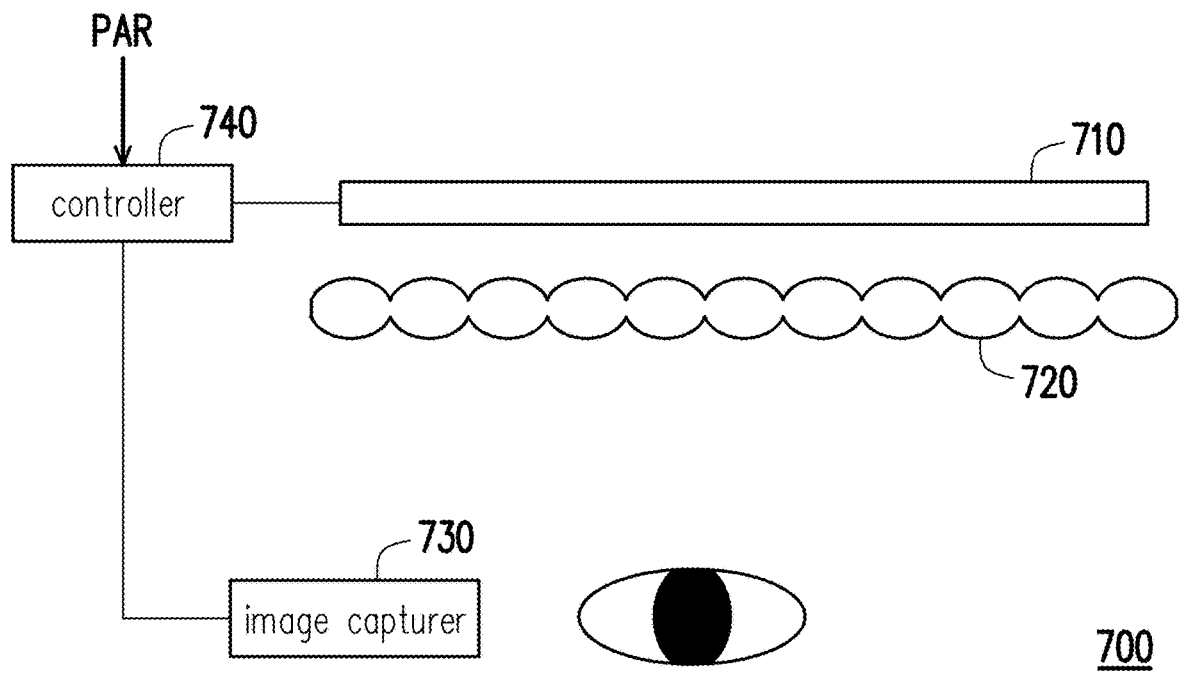
FIG. 7 is a schematic diagram illustrating a light field display apparatus according to an embodiment of the invention.

For the description below, referring to FIG. 7, FIG. 7 is a schematic diagram illustrating a light field display apparatus according to an embodiment of the invention. A light field display apparatus 700 is a monocular light field display apparatus. The light field display apparatus 700 includes a display 710, a light field device 720, an image capturer 730, and a controller 740. Specifically, the display 710 displays a plurality of block images. The light field device 720 is disposed to overlap with the display 710 and receives the block images displayed by the display 710 to generate a combination image. The image capturer 730 is disposed on a side of the light field device 720 where the combination image is generated and is configured to capture the combination image. The controller 740 is coupled to the display 710 and the image capturer 730 and performs the steps as described in the embodiment of FIG. 1.

It shall be noted that the controller 740 receives parameters PAR as the basis for generating characteristic patterns and adjusting the block images. The parameters PAR may include device-internal parameters of the display 710 and the light field device 720 and user parameters. The device-internal parameters of the display 710 and the light field device 720 may include optical information of the display 710, optical information of the light field device 720, and spatial information between the display 710 and the light field device 720. The user parameters include a pupillary distance, an eye relief, a pupil size, and a view direction of the user.

The parameters PAR may be stored in advance in a data storage device (e.g., a memory) built in the light field display apparatus 700 for the controller 740 to read. The user parameters may be inputted by the user based on an examination report generated for an optical examination on the eyes and may be stored in advance in the data storage device or manually inputted via an input interface (not illustrated) of the light field display apparatus 700.

The relevant details of the controller 740 performing the operations have all been sufficiently described in the foregoing examples and embodiments and shall not be repeatedly described here.

Figure 8:
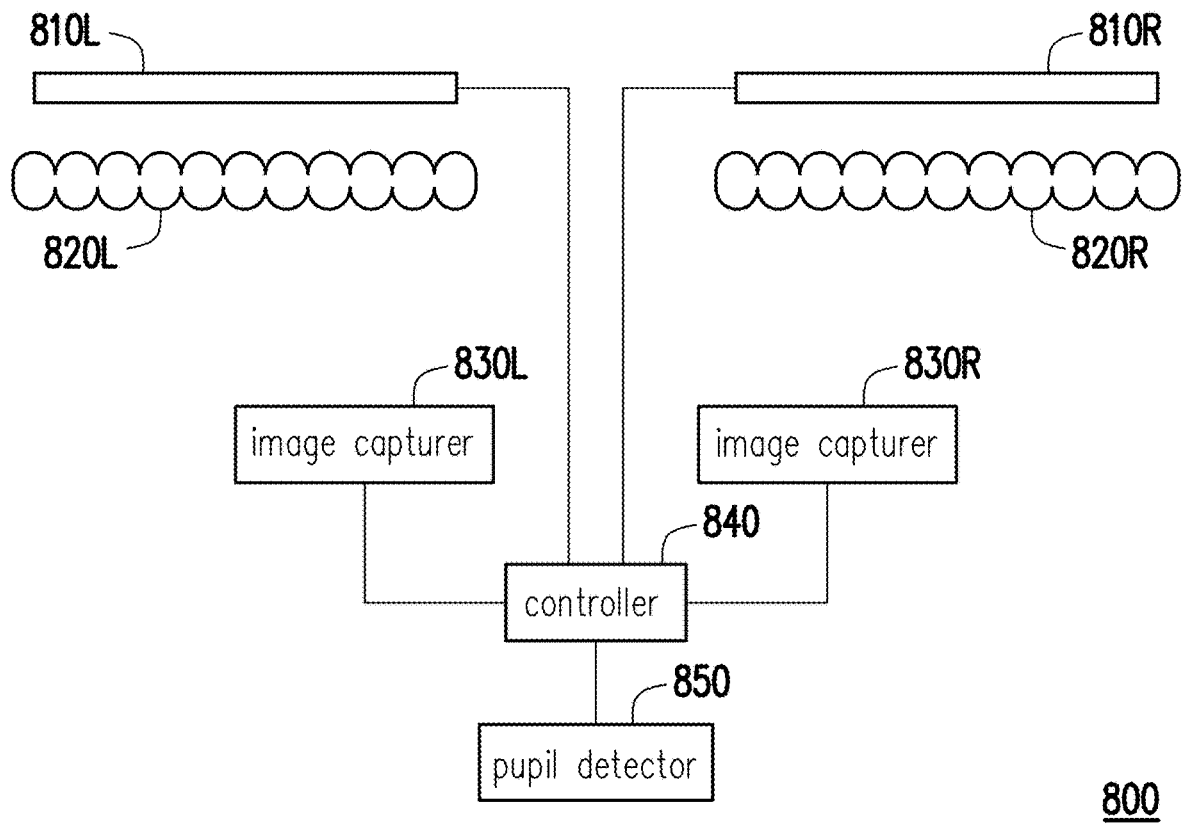
FIG. 8 is a schematic diagram illustrating a light field display apparatus according to another embodiment of the invention.

For the description below, referring to FIG. 8, FIG. 8 is a schematic diagram illustrating a light field display apparatus according to another embodiment of the invention. A light field display apparatus 800 is a binocular light field display apparatus. The light field display apparatus 800 includes displays 810L, 810R, light field devices 820L, 820R, image capturers 830L, 830R, a controller 840, and a pupil detector 850. Specifically, each of the displays 810L, 810R displays a plurality of block images. The light field devices 820L, 820R are disposed to respectively overlap with the displays 810L, 810R, and the light field devices 820L, 820R respectively receive the block images displayed by the displays 810L, 810R to respectively generate a left combination image and a right combination image. Therefore, the user is able to see a three-dimensional image through the light field display apparatus 800. The image capturers 830L, 830R are respectively disposed on a side of the light field devices 820L, 820R where the combination images are generated and are configured to capture the combination images (e.g., a pupil image of human eyes). The controller 840 is coupled to the displays 810L, 810R and the image capturers 830L, 830R and performs the steps as described in the embodiment of FIG. 1. Moreover, in other embodiments, the light field display apparatus may undergo a pre-shipment calibration after assembly. In that case, the image capturers 830L, 830R are respectively disposed at image forming positions (default user eye positions) to capture the combination image and perform the steps as described in the embodiment of FIG. 1 during the pre-shipment calibration.

It shall be mentioned that the embodiment further includes the pupil detector 850. The pupil detector 850 is coupled to the controller 840 and is configured to detect a pupil state of the user (e.g., a pupillary distance, a pupil size, a view direction, etc. of the user) and generate the user parameters according to a detection result.

Regarding hardware structures of the components in the embodiments of FIG. 7 and FIG. 8, the controllers 740, 840 may be processors having computational capability. Alternatively, the controllers 740, 840 may be designed through hardware description languages (HDL) or any other design methods for digital circuits familiar to people skilled in the art and may be hardware circuits implemented through a field programmable gate array (FPGA), a complex programmable logic device (CPLD), or an application-specific integrated circuit (ASIC).

Moreover, the image capturers 730, 830L, 830R may be constructed by applying image capturing devices familiar to people skilled in the art, e.g., charge-coupled device (CCD), CMOS (complementary metal-oxide semiconductor) sensors, etc. The pupil detector 850 may be similarly constructed through a pupil detecting device familiar to people skilled in the art. For example, the pupil detector 850 may include an image capturer for capturing an eye image of the user. The pupil detector 850 may then obtain the pupil state (e.g., a position, a size, and a view direction) of the user through identifying a pupil pattern in the eye image.

In summary of the above, in the invention, the error information is generated by comparing the block images on the display and the combination image generated by light field device, and the operation of adjusting the image of at least one of the block images is performed according to the error information along with the user parameters. Accordingly, without providing a mechanical adjustment device, the light field display apparatus can compensate for display errors that may be caused by the device-internal parameters and the user parameters, which not only enhances display quality, but also enhances convenience in use.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all ten is are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A method for calibrating a display image applicable to a light field display apparatus, the method comprising:
dividing a display image to generate a plurality of block images;
displaying the plurality of block images by a display, and passing the plurality of block images through a light field device to generate a combination image;
providing an image capturer to capture the combination image, and comparing the display image and the combination image to generate error information;
receiving user parameters; and
adjusting at least one of the plurality of block images in the display image according to the user parameters and the error information,
wherein the step of dividing the display image to generate the plurality of block images comprises: dividing the display image into the plurality of block images according to a plurality of sub-light field units of the light field device.

2. The method for calibrating a display image according to claim 1, further comprising:
receiving device-internal parameters of the display and the light field device; and
generating the display image according to the device-internal parameters, wherein the display image comprises at least one characteristic pattern,
wherein the characteristic pattern forms at least one comparison pattern in the combination image through the light field device.

3. The method for calibrating a display image according to claim 2, wherein the step of comparing the display image and the combination image to generate the error information comprises:
comparing a difference between the at least one characteristic pattern in the display image and the comparison pattern in the combination image to obtain the error information.

4. The method for calibrating a display image according to claim 3, wherein the step of adjusting the at least one of the plurality of block images according to the user parameters and the error information comprises:
calculating position information of the at least one characteristic pattern generating the error information; and
adjusting at least one error block image corresponding to the error information according to the error information and the user parameters.

5. The method for calibrating a display image according to claim 4, wherein the step of adjusting the at least one error block image corresponding to the error info nation according to the user parameters and the error information comprises:
adjusting the display image according to the error information and the user parameters to generate a precompensation image; and
correcting the at least one error block image according to the precompensation image.

6. The method for calibrating a display image according to claim 1, further comprising:
enlarging or reducing each of the block images according to the user parameters to adjust each of the block images.

7. The method for calibrating a display image according to claim 1, wherein the light field device is a micro-lens array, and the plurality of sub-light field units are micro-lenses.

8. The method for calibrating a display image according to claim 1, wherein a total area of the plurality of sub-light field units is greater than a display area of the display.

9. The method for calibrating a display image according to claim 1, further comprising:
detecting a pupil state of a user to obtain the user parameters.

10. A method for calibrating a display image applicable to a light field display apparatus, the method comprising:
dividing a display image to generate a plurality of block images;
displaying the plurality of block images by a display, and passing the plurality of block images through a light field device to generate a combination image;
providing an image capturer to capture the combination image, and comparing the display image and the combination image to generate error information;
receiving user parameters;
adjusting at least one of the plurality of block images in the display image according to the user parameters and the error information;
receiving device-internal parameters of the display and the light field device; and
generating the display image according to the device-internal parameters, wherein the display image comprises at least one characteristic pattern,
wherein the characteristic pattern forms at least one comparison pattern in the combination image through the light field device,
wherein the device-internal parameters of the display and the light field device comprise optical information of the display, optical information of the light field device, and spatial information between the display and the light field device, and the user parameters comprise a pupillary distance, an eye relief, a pupil size, and a view direction.

11. A light field display apparatus, comprising:
a display displaying a plurality of block images;
a light field device being disposed to overlap with the display, and the plurality of block images displayed by the display pass through the light field device to generate a combination image;
an image capturer capturing the combination image; and
a controller being coupled to the display and the image capturer and being configured to:
divide a display image to generate the plurality of block images;
compare the display image and the combination image to generate error information;
receive user parameters; and
adjust at least one of the plurality of block images in the display image according to the error information and the user parameters,
wherein the light field device comprises a plurality of micro-lenses arranged in arrays, and the controller divides the display image into the plurality of block images according to positions of the plurality of micro-lenses, wherein a total area of the plurality of micro-lenses is greater than a display area of the display.

12. The light field display apparatus according to claim 11, wherein the controller is further configured to:
receive device-internal parameters of the display and the light field device; and
generate the display image comprising at least one characteristic pattern according to the device-internal parameters,
wherein the characteristic pattern forms at least one comparison pattern in the combination image through the light field device.

13. The light field display apparatus according to claim 12, wherein the controller compares a difference between the at least one characteristic pattern in the display image and the comparison pattern in the combination image to obtain the error information.

14. The light field display apparatus according to claim 13, wherein the controller is configured to:
calculate position information of the at least one characteristic pattern generating the error information; and
adjust at least one error block image corresponding to the error information according to the error information and the user parameters.

15. The light field display apparatus according to claim 14, wherein the controller is configured to:
adjust the display image according to the error information and the user parameters to generate a precompensation image; and
correct the at least one error block image according to the precompensation image.

16. A light field display apparatus, comprising:
a display displaying a plurality of block images;
a light field device being disposed to overlap with the display, and the plurality of block images displayed by the display pass through the light field device to generate a combination image;
an image capturer capturing the combination image; and
a controller being coupled to the display and the image capturer and being configured to:
divide a display image to generate the plurality of block images;
compare the display image and the combination image to generate error information;
receive user parameters;
adjust at least one of the plurality of block images in the display image according to the error information and the user parameters;
receive device-internal parameters of the display and the light field device; and generate the display image comprising at least one characteristic pattern according to the device-internal parameters, wherein the characteristic pattern forms at least one comparison pattern in the combination image through the light field device, wherein the device-internal parameters of the display and the light field device comprise optical information of the display, optical information of the light field device, and spatial information between the display and the light field device, and the user parameters comprise a pupillary distance, an eye relief, a pupil size, and a view direction.

17. The light field display apparatus according to claim 11, further comprising:

a pupil detector coupled to the controller and configured to detect a pupil state of a user and generate the user parameters according to the pupil state.

18. A light field display apparatus, comprising:

a display displaying a plurality of block images;

a light field device being disposed to overlap with the display, and the plurality of block images displayed by the display pass through the light field device to generate a combination image;

an image capturer capturing the combination image; and a controller being coupled to the display and the image capturer and being configured to:

divide a display image to generate the plurality of block images;

compare the display image and the combination image to generate error information;

receive user parameters; and adjust at least one of the plurality of block images in the display image according to the error information and the user parameters, wherein the display comprises a right-eye display and a left-eye display, and the light field device comprises a first light field device and a second light field device, wherein the first light field device and the second light field device respectively correspond to the right-eye display and the left-eye display, the right-eye display and the left-eye display respectively display a plurality of first block images and a plurality of second block images, and the first light field device and the second light field device respectively generate a first combination image and a second combination image.

* * * * *